J. Z. BENEDICT.
ROPE GRIP.
APPLICATION FILED APR. 28, 1920.
1,399,182.
Patented Dec. 6, 1921.
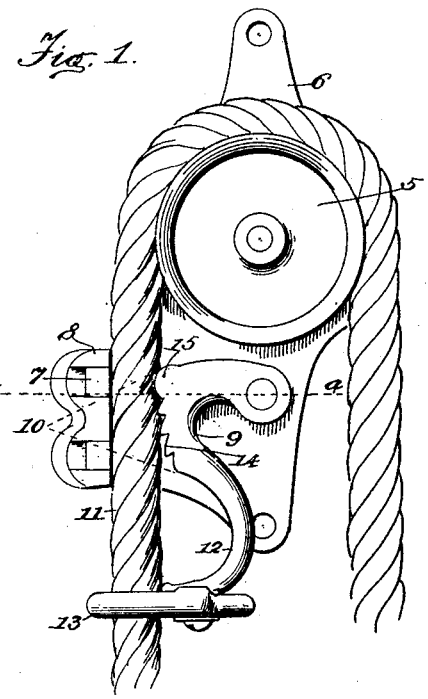
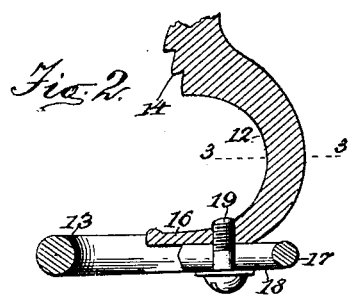
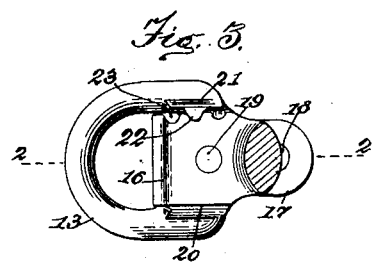
Inventor
James Z. Benedict
By J. M. St. John
Atty

UNITED STATES PATENT OFFICE.

JAMES Z. BENEDICT, OF CEDAR RAPIDS, IOWA.

ROPE-GRIP.

1,399,182.   Specification of Letters Patent.   Patented Dec. 6, 1921.

Application filed April 28, 1920. Serial No. 377,417.

*To all whom it may concern:*

Be it known that I, JAMES Z. BENEDICT, a citizen of the United States, residing at Cedar Rapids, in the county of Linn and State of Iowa, have invented certain new and useful Improvements in Rope-Grips, of which the following is a specification.

This invention relates to rope-grips, and more particularly to gripping mechanism applied to tackle-blocks, whereby the pull-rope may be locked in holding position.

The object of the invention is to improve the gripping dog so as to permit it to grip the rope securely and hold it against the counter-stress of the weight or other resistance, and also prevent accidental disengagement when such stress is relaxed.

A further object is to improve the guide-ring of the dog, so that the same may be adjusted to ropes of varying diameters.

The invention is fully disclosed in the description and claims following, reference being had to the accompanying drawing, in which:—

Figure 1 is an elevation showing mechanism embodying my invention, the application of the same in this case being a tackle-block with one of its cheek-plates detached. Fig. 2 is a section below the line 2—2 of Fig. 3, showing the tail-piece fastening and its guide-ring. Fig. 3 is a plan of the same below the section line 3—3 of Fig. 2.

In the drawing, the numeral 5 denotes the sheave of a tackle or pulley-block, one cheek-plate 6 of which is shown. To this is attached by bolts 7 an adjustable abutment 8. Opposite this abutment is pivoted a dog 9 having a serrated cam-jaw 10, to grip the rope 11 between it and the abutment. Below the jaw extends a tail-piece 12, provided at its lower end with a guide-ring 13, which will be described presently.

In the application of a gripping dog to a pulley-block no great difficulty has been experienced in holding the rope securely so long as stress was applied to it, the stress being adapted to tighten the dog on the rope, and so increase the grip. But owing to the elastic character of the rope, as soon as this stress was relaxed, the spring of the rope diametrically would force the dog to retreat, thus loosening its grip. This presented a condition of real danger, as where the tackle might be used to support anything on or about which workmen might be employed. The only practical solution of the difficulty was to so adjust the abutment block as to permit all the teeth of the dog to pass the "dead center," the line *a—a* of Fig. 1, or at least approach the line so nearly that the elasticity of the rope would not force the dog backwardly. To permit all the teeth of the dog to reach and pass this line was itself dangerous, since a smaller portion, or a softer section of rope might reach the dog, and not be properly gripped by it at all. This invention is designed to embody such a construction of the dog as will allow it the gripping capacity of its full complement of teeth, but will, in the initial gripping act, lock the dog against back-slipping, and prevent any release except by a positive act of the operator.

Referring now to Fig. 1 it will be seen that in advance of the gripping teeth 14 of the dog is a smooth, rounded hump or swell, 15. This, as stress on the rope, and its swing by the operator, draws the dog to gripping position, makes a slight indentation in the rope, but does not grip it, and so passes the dead center line. Once past this line, no mere relaxation of the rope's tension will permit disengagement of the dog, and this can only take place by forcibly swinging the depending portion of rope to the right, considered with respect to Fig. 1.

In order that there may be little or no lost motion of the rope in its guide, the same is made adjustable as to diameter. The lower end 16 of the tail-piece is accordingly expanded to about the width of the inside diameter of the guide-ring 15. The ring itself has an extension 17 with a slot at 18 to receive a fastening screw 19. Ribs 20 and 21 prevent the parts from twisting on each other. The latter rib is provided with a tooth 22 to engage notches 23 in the tail-piece. This permits several adjustments of the guide-ring, according to the diameter of the rope used, and makes it possible to operate the dog with no more side swing of a small rope than of a large one.

Having thus described my invention, I claim:

1. A rope-grip, comprising in combination a cheek-plate, an attached abutment, and an oppositely disposed dog having a cam-shaped gripping face with a preceding enlargement of greater radial projection than the shorter radius of the cam.

2. A rope-grip, comprising a cheek-plate, an attached abutment, an oppositely disposed serrated and cam-faced pivoted dog, having an enlargement in advance of the gripping face of greater radius than the shorter radius of the cam, to lock the dog when the enlargement passes the dead center.

3. A rope-grip, comprising a cheek-plate, an attached, adjustable abutment, and an oppositely disposed, pivoted dog, having eccentrically disposed gripping teeth, and in advance thereof a hump or swell, projecting radially farther than the first gripping tooth, to lock the dog when past the dead center.

4. A rope-gripping dog having a gripping face, an extended tail-piece, and an adjustable guide-ring for the rope attached thereto, and by means of which the dog may be swung by the rope into and out of gripping position.

5. In a rope-gripping dog, a tail-piece having an expanded end, a guide-ring fitting thereon, and having a slotted extension, and a fastening screw to connect the parts.

6. A rope-gripping dog, having a tail-piece with an expanded end with notches therein, a guide-ring attachable thereto and having a tooth to engage said notches, a slotted extension fitting said expanded end, and a screw to fasten the parts together.

In testimony whereof I affix my signature in presence of two witnesses.

JAMES Z. BENEDICT.

Witnesses:
F. W. ARMSTRONG,
J. M. ST. JOHN.